United States Patent [19]

Sharkey

[11] 4,227,199

[45] Oct. 7, 1980

[54] METHOD AND DEVICE FOR TIME-RECORDING

[76] Inventor: Stephen R. Sharkey, 43 Ventana Ct., Lawrence, N.Y. 11559

[21] Appl. No.: 37,558

[22] Filed: May 9, 1979

[51] Int. Cl.³ .......... G01D 9/00

[52] U.S. Cl. .......... 346/1.1; 101/DIG. 1; 283/8 R; 346/19; 346/47; 346/85; 346/134

[58] Field of Search .......... 346/1, 19, 46, 47, 80, 346/83, 82, 85, 135, 134, 146; 101/DIG. 1; 35/9 G; 283/8 R, 9 R

[56] References Cited

U.S. PATENT DOCUMENTS

| | | | |
|---|---|---|---|
| 375,087 | 12/1887 | Merritt | 346/19 |
| 2,968,521 | 1/1961 | Gross | 346/85 |
| 3,349,408 | 10/1967 | Gillen | 346/112 |

*Primary Examiner*—Joseph W. Hartary
*Attorney, Agent, or Firm*—Thomas L. Tully

[57] ABSTRACT

A double check or safety system for recording information of two types on a record sheet, such as a time clock card. One type of information is applied automatically to a first predetermined area of the record sheet when the sheet is inserted into a machine, such as the entrance time and exit time stamped onto the record sheet by a time clock. The other type of information is applied manually by the operator, such as a signature applied by the operator to a second predetermined area of the record sheet associated with the time stamp area. The invention comprises the step of automatically wetting said second predetermined area with a color-forming chemical, either before or simultaneously with the automatic application of the said one type of information to the first predetermined area and thereafter manually applying said other type of information to said wetted area, such as by applying a written signature using a pen containing a complimentary liquid which is substantially colorless but which is reactive with said color-forming liquid, while the latter is in liquid state, to form a colored, legible reaction product in the form of an ink signature.

6 Claims, 3 Drawing Figures

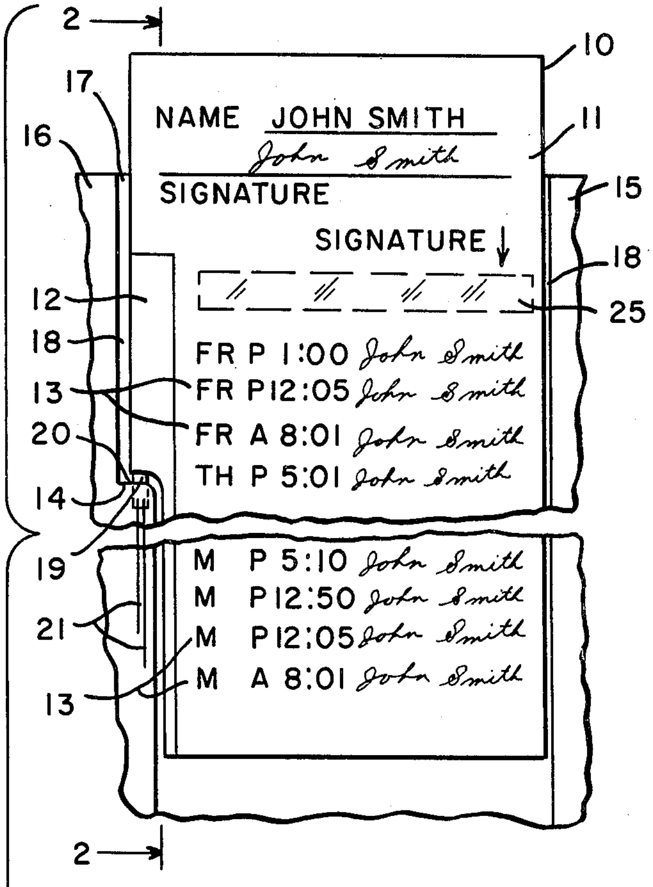
FIG. 1
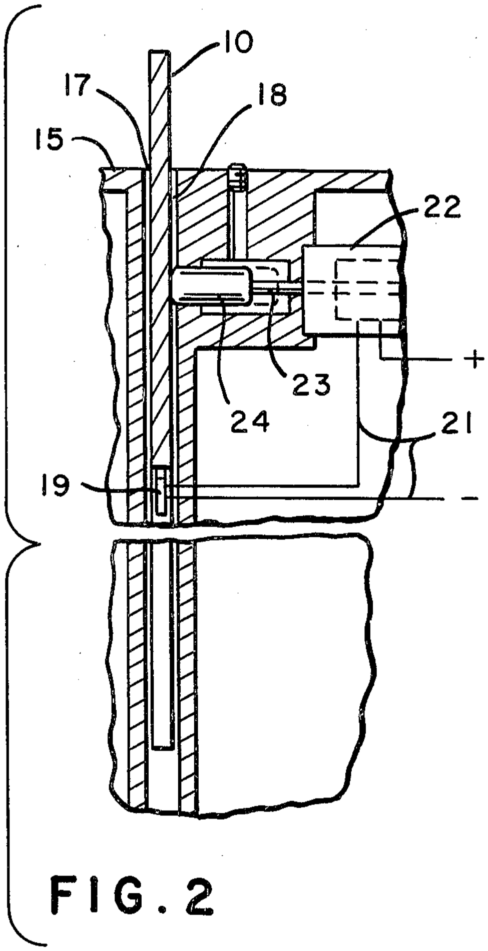
FIG. 2
FIG. 3
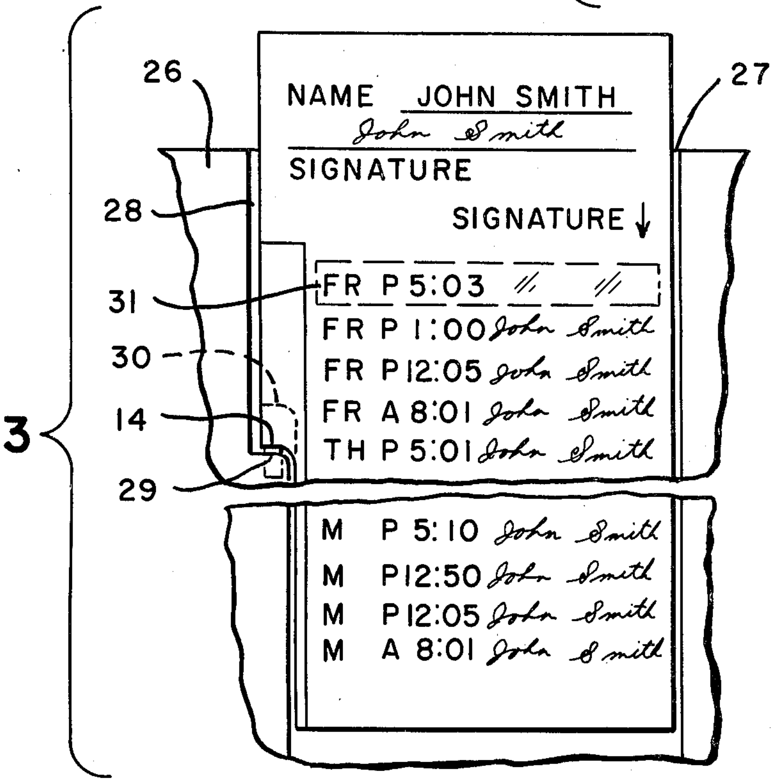

METHOD AND DEVICE FOR TIME-RECORDING

BACKGROUND OF THE INVENTION

Time clocks or attendance time recorders are used extensively in industry as a means for automatically stamping the entrance and exit times on an employee's record card. The time record is used as a basis for calculating the pay due to hourly employees and as a record of the employee's tardiness, lunch breaks and departure time.

While the time clock automatically positions the record card and embosses the time stamps therein to preclude overstrikes and fraudulent alteration, no means is provided to establish that the time card was actually stamped or punched by the employee identified on the card, i.e., it is possible for one employee to punch in and/or out for another, thereby permitting the other employee to arrive late, leave early or even miss a day without detection by the time clock system.

While it is possible to prevent such abuses by assigning an attendant to the time clock, such is expensive and is only as reliable as the attendant.

Other proposals have been made to prevent time clock fraud but these are unsatisfactory because they require that the modern expensive time clocks, which are now in widespread use because of their reliability, be replaced with different clocks which may be less reliable and which involve additional expense. For example, U.S. Pat. No. 47,266 relates to a revolving time chart which must be signed when the time is recorded, while U.S. Pat. No. 1,395,400 relates to system in which the employee's fingerprint is recorded with the punch time.

SUMMARY OF THE INVENTION

The present invention relates to a method and apparatus for automatically applying latent or visible time-stamp indicia and a latent image-enabling liquid checmial to predetermined associated areas of a record sheet, said chemical only being liquid on said sheet for a limited time period and being inactive thereafter, and manually applying a signature to the area of said sheet carrying said liquid chemical using a second liquid complimentary chemical which is reactive with said signature-enabling chemical to form a visably-colored reaction product.

According to a preferred embodiment of the present invention, both the time stamp and signature areas of the record sheet are wetted with said latent image-enabling liquid chemical in a first wetting device which applies the chemical to predetermined areas of the record sheet corresponding to the area which will receive the time stamp and an associated area adapted to receive the signature of the operator. Immediately thereafter, the wetted record sheet or card is (a) inserted into a conventional time clock which has been modified by replacing the colored ink ribbon with a ribbon containing a substantially-colorless chemical ink which is reactive with the image-enabling liquid chemical applied by the wetting device to form a colored time stamp, and (b) promptly withdrawn and signed by the operator in the associated signature area, while the latter is still wet, using a writing device containing a supply of a substantially-colorless chemical ink which is reactive with said wetting liquid to form a visably-colored reaction product providing the legible signature of the operator. Alternatively, steps (a) and (b) may be reversed, the critical requirement being that the time record card must be time-stamped and signed within a time period of a few minutes, before the color-forming liquid on the card dries out, thereby preventing the possibility of the card being time-stamped at one time and signed at a time which differs from the stamping time by more than a few minutes.

Most preferably, the present invention is adapted for use with conventional time clocks, such as those commercially available under the trademark Amano Model 6500 and Model 6700, without the need to modify such time clocks other than the optional use therein of stamping ribbons which are impregnated with substantially colorless, color-forming liquid chemicals in place of the conventional inked ribbons. Such time clocks include a mechanism for incrementally clipping the edge of the time card, from the bottom left-hand margin, each time a new time stamp is recorded, so that the card will be received a greater distance into the machine each time it is inserted. This prevents overprinting of the time stamps and, according to a preferred embodiment of the present invention, permits the separate wetting device to apply the color-forming liquid to the exact area of the time card to which the signature and, optionally, the time stamp is to be applied. Other conventional time clocks may also be used which contain movable internal indexing means which correlate the insertion position of the time card with the time of day and the day of the week so that the time stamp is applied to the appropriate location of the time card. In such case, the wetting device must also contain similar movable internal indexing means which correlate the insertion position of the time card with the time of day and day of the week so that the card is wetted in the appropriate location associated with the time stamp location.

Reference is made to the accompanying drawing in which:

FIG. 1 is a segmented front view of a time card inserted in activation position within a wetting device according to one embodiment of the present invention, the wetting device being cut away for purposes of illustration;

FIG. 2 is a view taken along the line 2—2 of FIG. 1 and illustrating the front portion of the wetting device including the wetting stamp element, and FIG. 3 is a segmented front view of the wetted time card of FIG. 1 inserted in activation position within a time clock, the latter being cut away for purposes of illustration.

Referring to the drawing, the time card 10 has a printing face 11 and a left-hand margin 12 comprising a lower clipped portion which has been cut away in increments corresponding to the length of the card occupied by each of the time stamp indicia 13, the base of the uncut margin proving a shoulder 14 which projects beyond the lower cut portion of the card 10.

The shoulder 14 functions as an activation means for the wetting device 15, as illustrated by FIGS. 1 and 2. The wetting device 15 comprises a housing 16 having a central vertical slot opening 17 which is adapted to receive a time card 10. The slot opening 17 opens into a wetting chamber 18 having a width slightly greater than the width of the uncut portion of the time card 10, which in turn opens into a lower card-receiving chamber which has a width slightly greater than the cut portion of the time card 10 but less than the width of the uncut portion of the time card 10. Thus, the time card can only be inserted a certain distance into the slot opening 17, which distance is predetermined by the location of the shoulder 14 at the base of the uncut margin 13 of the card. Moreover, the card must be inserted said distance in order to activate the wetting device, whereby the operator is prevented from re-wetting a previously-stamped area of the card or pre-wetting and signing an area of the card to be time-stamped at a later time. Thus, the activation of the wetting device may be accomplished by means of the shoulder 14 of the card contacting a button or switch 19 present on the step 20 of the wetting device housing connecting the wider wetting chamber 18 and the more narrow lower card-receiving chamber.

The switch 19 comprises leads 21 which connect a solenoid 22 to a power source, as illustrated by FIG. 2. The piston 23 of the solenoid is connected to a porous stamp element 24 which is impregnated with a substantially-colorless, color-forming liquid chemical, the piston and stamp element being supported within an opening in the housing 16 for movement between normal retracted position, shown by means of broken lines, and activated position, shown by means of solid lines in FIG. 2. Thus, when the card is inserted, as shown the shoulder 14 activates switch 19 to cause the enrgization of solenoid 22. When the solenoid 22 is energized, the piston 23 is extended to move the porous stamp element 24 from inactive position, in which it does not project into the wetting chamber 19, to active or wetting position in which it is projected into the wetting chamber 19 and against the printing fact 11 of the time card 10 to wet the predetermined area thereof with the color-forming liquid chemical.

The dimensions and location of the wetting element 24 are such that only the next area of the time card to be time-stamped is wetted, thereby preventing any other area from being wetted or re-wetted for purposes of applying a signature to other areas of the card.

After momentary activation of the wetting device, the time card 10 is withdrawn from the slot opening 17. The release of the pressure between the card shoulder 14 and the switch 19 deactivates the solenoid 22 to retract the piston 23 and wetting element 24 so that the card can be withdrawn cleanly from the slot opening 17.

Next, the operator signs and time-stamps the wetted card, or vice-versa, the only requirement being that the signature must be applied while the wetted area of the card remains wet. This requirement also applies to the time stamp if the latter is also formed by color-reaction rather than by the use of colored ink. The drawing illustrates the wetting of an area 25 comprising both the time stamp area and the signature area of the time card with the color-forming liquid, whereby both the time stamp and signature must be applied at substantially the same time period of a few minutes. If desired, the time stamp may be applied by means of colored ink but such a system is not as fraud-proof as the use of color-forming liquid to form both the time stamp and the signature because the time stamp and signature can be applied at different times. The opportunity for fraud can be reduced by designing the wetting machine 15 so that a previously time-stamped card cannot be wetted at a later time in an area opposite an area carrying a time stamp. The machine 15 of FIGS. 1 and 2 is of such design since the wetted area 25 is above the last time stamp. However, this does not prevent the operator from wetting and signing a time card well in advance of the insertion of the card into the time clock, i.e., an employee might leave work early and an accomplice can punch his time card at the end of the day. Therefore, as mentioned, it is preferred with machines of this type that the time stamp and signature are both dependent upon development while the time card is wet with the development liquid. Such opportunity for fraud is not present with time clocks and wetting devices containing time-related internal indexing means because the operator has no control over the areas of the card which are wetted and time-stamped and both steps must be taken before the indexing means advances.

Referring again to the drawing, the wetted time card is withdrawn from the wetting device of FIGS. 1 and 2 and is promptly inserted into a conventional time clock 26, as shown by FIG. 3, preferably before the operator applies his signature with a pen containing a supply of complimentary color-forming ink. The time clock 26 is not shown in detail in FIG. 3, since it is a conventional machine such as an Amano Model 6500 Series NR-7X having a central vertical slot opening 27 adapted to receive the time card 10, a time punch chamber 28 having a width slightly greater than the width of the uncut portion of the time card, a lower, more narrow card-receiving chamber and a step 29 adapted to be contacted by the shoulder 14 of the card when the card is fully inserted to activate the time printer mechanism and the card margin clipper, neither of which is illustrated since the mechanism is conventional. However, FIG. 3 does illustrate, by means of broken lines 30, the portion of the card margin which is clipped during the printing of the time stamp 31, the latter arising from the color reaction between the liquid present in wetted area 25 of the card and the complimentary liquid printed thereon by the time clock.

Finally, the time-printed card is promptly withdrawn from the time clock 26 and is signed in the portion of area 25 opposite the current time stamp 31 while area 25 is still wet to produce a chemical visible development of the signature.

A wide variety of conventional color-forming chemicals may be used according to the present invention, the only requirement being that the color-forming or color-permitting chemical applied by means of the wetting device must be in a form which loses its liquidity within a limited time period, such as ten minutes or less, and most preferably within two minutes or less under ambient conditions. Preferably, the card-wetting liquid comprises a solution having an evaporation color-forming chemical in a volatile solvent having an evaporation temperature of about 212° F. or less, and more preferably a volatile organic solvent having an evaporation temperature between about 70° F. and 200° F., most preferably between about 100° F. and 170° F. Such solutions remain liquid for a few minutes on time card stock at ambient room temperature before the volatile solvent evaporates into the atmosphere to leave the dried re-crystallized color-forming chemical in solid non-reactive condition.

Among the suitable solvents are water and the lower aliphatic alcohols, such as methanol, ethanol and isopropanol; aliphatic ketones such as acetone, and methyl ethyl ketone; aliphatic esters such as ethyl acetate, and similar volatile solvents which are non-toxic and non-corrosive.

Among the suitable color-forming chemical compounds which may be used in dissolved condition in aqueous or hygroscopic solvents to provide the reactive wetting liquid are metal salts, such as disclosed in U.S. Pat. Nos. 2,299,693 and 2,872,863; nickel cobalt, copper and other heavy metal salts, as disclosed in U.S. Pat. Nos. 2,864,720 and 2,936,707; and other conventional color-forming, soluble solids which are only reactive with the complimentary color-former applied by the signature pen and, if desired, by the time stamp ribbon when they are present in dissolved, ionized form. Thus, once the water solvent, such as ethanol, is evaporated the colorless metal salt crystallizes on the time card and is not reactive with the complimentary color-forming chemical applied by means of this signature pen or time stamp ribbon.

Suitable complimentary chemicals are also disclosed by the aforementioned patents, including gallic acid for use with the iron salts, and rubeanic acid for use with nickel salts. Such chemicals are incorporated into non-drying liquid vehicles, such as oils, to form liquid colorless "inks" which are incorporated into ball point pens or other writing devices and, if desired, are substituted for the normally colored ink present in the fabric ribbon of the time clock. The only requirement is that such "inks" are not capable of dissolving, ionizing or reacting with the complimentary chemical present on the time card after the wetting fluid has dried.

The phrase "color-forming material" is intended to include not only the co-reactive chemicals but also the ionization medium, such as an aqueous solvent or a catalyst or any other material which is essential to the color-forming reaction taking place. For example, both of the co-reactant color-formers, such as metal salt and gallic acid or rubeanic acid, or color-forming dye precursors and couplers, etc., may be present in the signature ink or time clock ribbon provided that such materials are not co-reactive in the absence of a solvent, ionization medium, catalyst, pH regulator or other liquid element which is supplied by the wetting device.

As noted supra, the essential feature of the present method and apparatus is to correlate the punching of the time card in a conventional time clock with the signing of the time card so that both steps must be taken within a time period of a few minutes, thereby avoiding the possibility of fraud in the use of the time clock.

It will be obvious to those skilled in the art that the wetting device may be incorporated in the time clock to produce a single device which simultaneously wets the required signature area of the card while stamping the time and clipping the margin, whereby the operator merely has to apply his signature opposite the time-punched area before the wetted area dries. Such area cannot be re-wetted, and signed at a lster time because the clipping of the margin of the card causes the card to be stamped and wetted in a different area the next time the card is inserted into the time clock.

Variations and modifications of the present invention will be apparent to those skilled in the art within the scope of the present claims.

I claim:

1. Method for applying written and automatically-printed indicia to a record sheet and for correlating the time period during which said different indicia must be applied to said record sheet, comprising the steps of automatically wetting a predetermined area of the record sheet with a color-permitting material which remains liquid on said sheet for a limited time period, automatically printing indicia on a predetermined area of said record sheet associated with said wetted area of said record sheet, and applying written indicia to said wetted area, while said color-permitting material is still liquid, using a substantially colorless writing liquid which is capable of developing colored written indicia in the presence of said liquid color-permitting liquid.

2. Method according to claim 1 in which said automatically-printed indicia is also printed onto the predetermined, wetted area of the record sheet, using a substantially-colorless printing liquid which is capable of developing colored printed indicia in the presence of said liquid color-permitting material.

3. Method according to claim 1 in which said record sheet is a time card, said printed indicia comprises time stamp indicia printed by means of a time clock and said written indicia comprises a signature written by means of a pen containing a supply of said writing liquid.

4. Method according to claim 3 in which the area of said record sheet which is wetted is automatically variable to correspond to the area of the record sheet which is to be printed, whereby rewetting of the same area after printing said indicia is prevented.

5. A system for applying written indicia to a predetermined first area of a record sheet adapted to be automatically stamped with printed indicia in a predetermined second area associated with said first area and for correlating the time period during which said different indicia must be applied to said record sheet, comprising a wetting device including means for limiting the entry position of a record sheet to a predetermined variable position, means for automatically wetting a predetermined first area of said record sheet corresponding to said entry position with a color-permitting material which remains liquid on said sheet for a limited time period, said wetted area being adapted to develop colored written indicia upon the application thereto of a substantially-colorless complimentary writing liquid present within a writing instrument but being incapable of such development after a brief time period sufficient to dry said color-permitting material.

6. A system according to claim 5 in which said wetting means is adapted to wet both said first area and said second area with a color-permitting liquid, said wetted areas being adapted to develop colored written and printed indicia, respectively, upon the application thereto of substantially-colorless complimentary writing and printing liquids present within a writing instrument and a printing instrument, respectively.

* * * * *